United States Patent [19]

Stranders

[11] 4,316,589
[45] Feb. 23, 1982

[54] SPOOL HUB FOR TAPE CARTRIDGES OR THE LIKE

[75] Inventor: Rolf Stranders, Thalwil, Switzerland

[73] Assignee: ICM Cassettes Merchandiser Limited, Buttikon, Switzerland

[21] Appl. No.: 83,739

[22] Filed: Oct. 11, 1979

[30] Foreign Application Priority Data

Oct. 16, 1978 [CH] Switzerland ................. 10711/78

[51] Int. Cl.³ .................... G03B 1/04; G11B 15/32
[52] U.S. Cl. ................................ 242/197; 242/71.8
[58] Field of Search ................. 242/197–200, 242/68.3, 71.8; 352/78 R; 360/96, 132

[56] References Cited

U.S. PATENT DOCUMENTS 3,669,374  6/1972  Catalano et al. ............ 242/55.19 A
3,974,975  8/1976  Holmes ........................ 242/55.19 A
4,191,984  3/1980  Kidate et al. ....................... 360/132

FOREIGN PATENT DOCUMENTS 1041841  10/1958  Fed. Rep. of Germany ...... 242/128

OTHER PUBLICATIONS

IBM Technical Disclosure Bulletin, vol. 17, No. 11, p. 3358, Apr., 1975, B. W. McGinnis "Lateral Flexibility for A Self-Ventilated Flexible Disk Pack."

Primary Examiner—Leonard D. Christian
Attorney, Agent, or Firm—Ladas & Parry

[57] ABSTRACT

A spool hub for tape cartridges or cassettes, especially sound recording tape cartridges provided with slide or anti-friction foils, wherein the hub body is equipped with passageways or openings distributed at or over the circumference of the hub body. The passageways are advantageously located between blade-like webs. With this construction there is particularly reduced the friction between the spool and the slide or anti-friction foils, so that there prevail lower temperatures and there is accomplished a reduction of the undesired noise level.

3 Claims, 2 Drawing Figures

SPOOL HUB FOR TAPE CARTRIDGES OR THE LIKE

BACKGROUND OF THE INVENTION

The present invention relates to a new and improved construction of spool hub for tape cartridges or cassettes, especially sound recording tape cartridges containing slide or anti-friction foils.

With heretofore known sound recording tape cartridges or cassettes there is desired as low as possible friction between the spool hub and the slide foil or foils contacting therewith. Yet, with the heretofore known constructions this is not readily possible. With state-of-the-art tape cartridges or cassettes of the aforementioned type there furthermore arise undesired noises at high operating speeds. During such high speeds, for instance when winding-up the tape, there can develop relatively high temperatures, which, of course, are likewise undesired. It can even happen that when using, for instance, polyethylene foils the latter, owing to the existence of the high temperatures developed when winding-up the tape, weld at the housing.

SUMMARY OF THE INVENTION

Therefore, with the foregoing in mind it is a primary object of the present invention to provide a new and improved construction of spool hub for tape cartridges or cassettes which is not afflicted with the aforementioned drawbacks and limitations of the prior art constructions.

Another and more specific object of the present invention aims at providing a new and improved construction of spool hub which for the most part eliminates the aforementioned disadvantages, without engendering any type of drawbacks.

Yet a further significant object of the present invention is to provide a new and improved construction of spool hub for tape cartridges or cassettes which is relatively simple in construction and design, economical to manufacture, reduces the tendency of undesired heat development, particularly at high winding speeds, and generally provides improved performance in terms of the drawbacks existent with the prior art tape cassettes previously discussed.

Now in order to implement these and still further objects of the invention, which will become more readily apparent as the description proceeds, the spool hub of the present development is manifested by the features that the hub body is provided with passages or openings which are distributively arranged at or over the circumference of such hub body. The passages are preferably provided at the same spacing from one another and are formed by the provision of bores or similar type of perforations or openings.

An especially advantageous construction resides in providing, between an inner hub ring and an outer hub ring, a multiplicity of tandemly arranged blade or spoke-like webs. Such constructed hub possesses the external appearance of a ventilator. Also without any special construction of the blade-like elements and corresponding passages, there is automatically produced an air circulation by virtue of the inventive construction.

This air circulation counteracts the otherwise conventionally present friction, so that the friction, particularly between the hub and the slide foils, is appreciably reduced. It has been found that at the same time there is also eliminated the undesired noise, since such partially is attributable to the direct contact.

The air circulation or air rotation likewise counteracts any possible temperature increase, so that there practically are eliminated the heretofore mentioned drawbacks.

The construction of the spool hub according to the invention additionally has an auxiliary advantage, in that the passages or perforations provide an optical indication as concerns spool travel.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
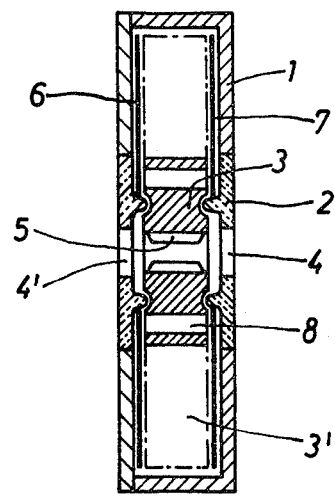
FIG. 1 is a schematic sectional view taken through a tape cartridge or cassette equipped with slide foils.

Describing now the drawings, in FIG. 1 there is shown a sectional view through a tape cartridge or cassette according to the invention, which essentially comprises a housing 1 and a spool body or hub 3 which is placed within the housing 1. The housing 1 is provided at the center of each tape roll with a transparent part 2 in which there is also freely rotatable the spool hub 3 and retained with relatively large play. The magnetic tape 3' is wound off and on the spool body or hub 3 in conventional fashion.

Additionally, it will be seen that the housing 1 is provided at location 4 with an opening or passageway into which there can engage the drive hubs so that the spool hub 3 can be placed into rotation by means of the drive cams 5 or equivalent structure.

With the illustrated embodiment there is arranged between the not particularly referenced walls of the housing 1 and the spool hub or spool body 3, with the tape wound thereon, a respective slide or anti-friction foil 6 and 7. These foils 6 and 7 are stationary. Each such foil 6 and 7 advantageously consists of a material having good anti-fraction properties, so that the rotating tape spool neither experiences damage nor is exposed to any excessive amount of friction.

As already previously explained with the prior art constructions of this type too much friction is present, which, on the one hand, leads to excessive temperatures and, on the other hand, to the development of undesired noise.

According to particular aspects of the invention the spool body or hub 3 is provided with a multiplicity of passages or openings 8 which automatically initiate an air circulation internally of the tape cartridge or cassette. Of course, this air circulation becomes that much better as the passages 8 are designed in consideration of flow or aerodynamic aspects. In the event the passages or openings 8 are filled with vane-like webs, then there is realized the best ventilator effect.

Figure 2:
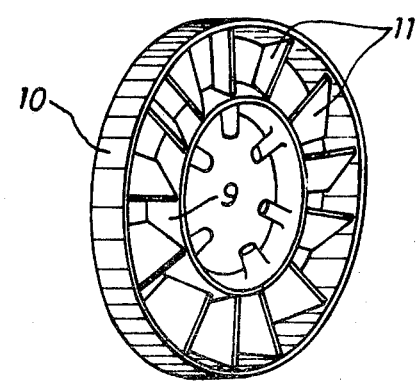
FIG. 2 illustrated in perspective view a spool hub constructed according to the invention.

FIG. 2 of the drawing shows in perspective view a possible construction of the spool hub, wherein, by virtue of the particular design there can be expected particularly good results. The spool hub comprises an inner ring 9 and an outer ring 10. Both of the hub rings 9 and 10 are rigidly interconnected by means of a multiplicity of blade or spoke-like webs 11. These blades or spoke-like webs 11 generate, internally of the tape cartridge, an extremely effective circulation of the air, so that there are beneficially realized the previously mentioned effects.

It has also been found even when using passages or openings in the form of bores and the like there is promoted an air circulation which particularly reduces friction.

While there are shown and described present preferred embodiments of the invention, it is to be distinctly understood that the invention is not limited thereto, but may be otherwise variously embodied and practiced within the scope of the following claims.

Accordingly, what is claimed is:

1. A spool hub for tape cartridges, especially sound recording tape cartridges provided with slide foils, comprising a hub body which comprises an inner hub ring, an outer hub ring spaced from the inner hub ring, and a multiplicity of successively arranged webs disposed between said inner hub ring and said outer hub ring and forming passages which are angularly spaced about the center of said hub body in such manner as to enhance air circulation in the associated cartridge.

2. The spool hub as defined in claim 1, wherein said webs are in the form of substantially blade-like webs.

3. The spool hub as defined in claim 1, wherein said webs are in the form of substantially spoke-like webs.

* * * * *